United States Patent [19]

Lathers et al.

[11] Patent Number: 4,711,496

[45] Date of Patent: Dec. 8, 1987

[54] VEHICLE SEAT CONSTRUCTION

[75] Inventors: Michael W. Lathers, Metamora; Richard P. Bruning, Royal Oak, both of Mich.

[73] Assignee: General Motors Corporation, Detroit, Mich.

[21] Appl. No.: 888,714

[22] Filed: Jul. 24, 1986

[51] Int. Cl.$^4$ ............ A74C 5/00; A74C 7/00; B60R 22/12
[52] U.S. Cl. .................... 297/452; 297/218; 297/444; 297/460; 297/468
[58] Field of Search .............. 297/218, 219, 225, 443, 297/444, 452, 458, 460, 468; 5/431, 434, 436

[56] References Cited

U.S. PATENT DOCUMENTS

| | | | |
|---|---|---|---|
| 2,056,767 | 10/1936 | Blath | 297/452 X |
| 3,134,988 | 7/1986 | Reed . | |
| 4,597,386 | 7/1986 | Goldstein | 297/460 |
| 4,610,480 | 9/1986 | Yamada et al. . | |

FOREIGN PATENT DOCUMENTS 2469315  5/1981  France ................ 297/452

Primary Examiner—Kenneth J. Dorner
Assistant Examiner—Peter R. Brown
Attorney, Agent, or Firm—Ernest E. Helms

[57] ABSTRACT

The present invention provides a motor vehicle seat. The inventive seat has a back and/or femur cushion which includes a flexible spider with projecting legs captured between inner and outer pan shaped shells. The legs are folded over to provide a cushion and are also utilized to provide a shoulder or lap restraint.

3 Claims, 10 Drawing Figures

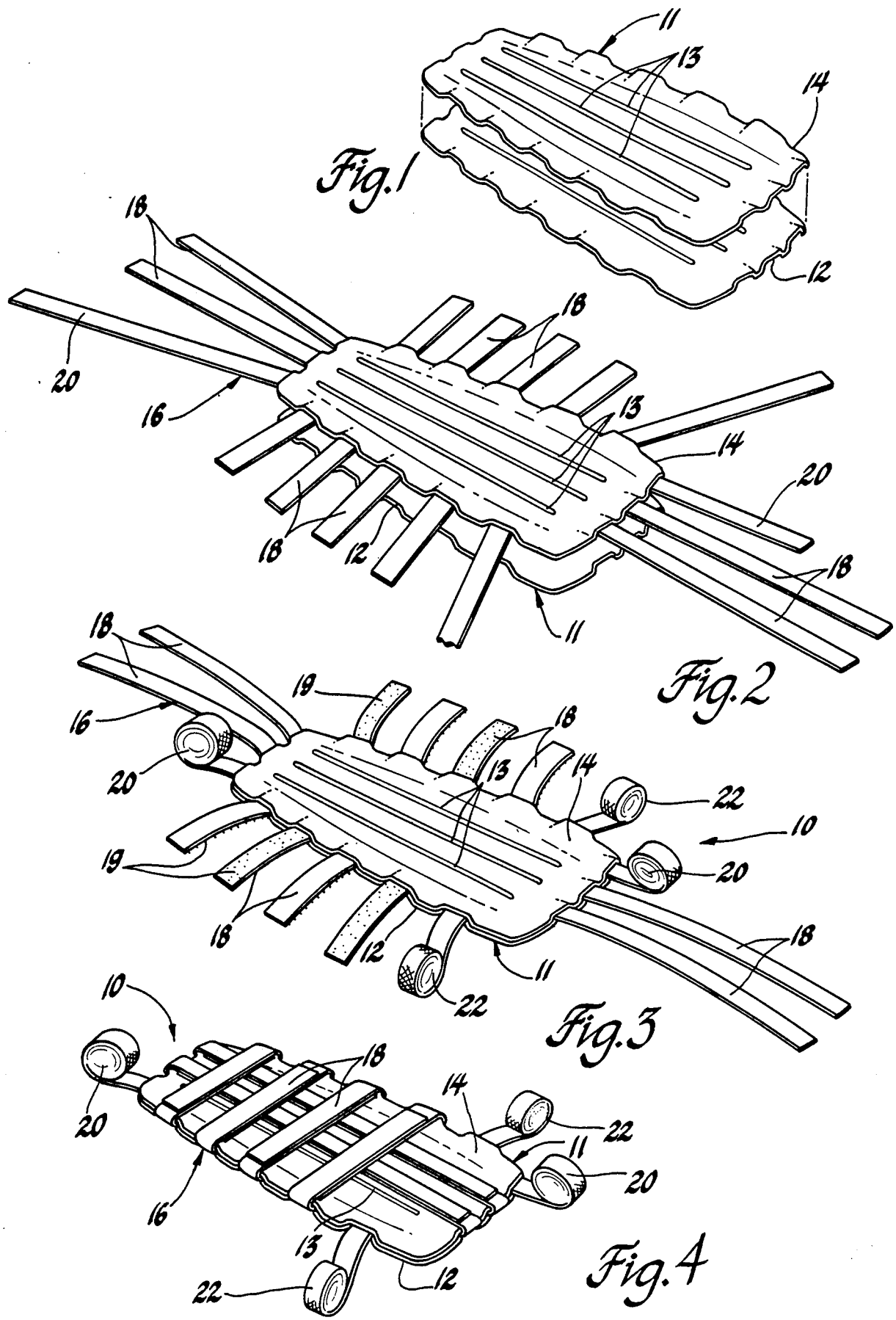

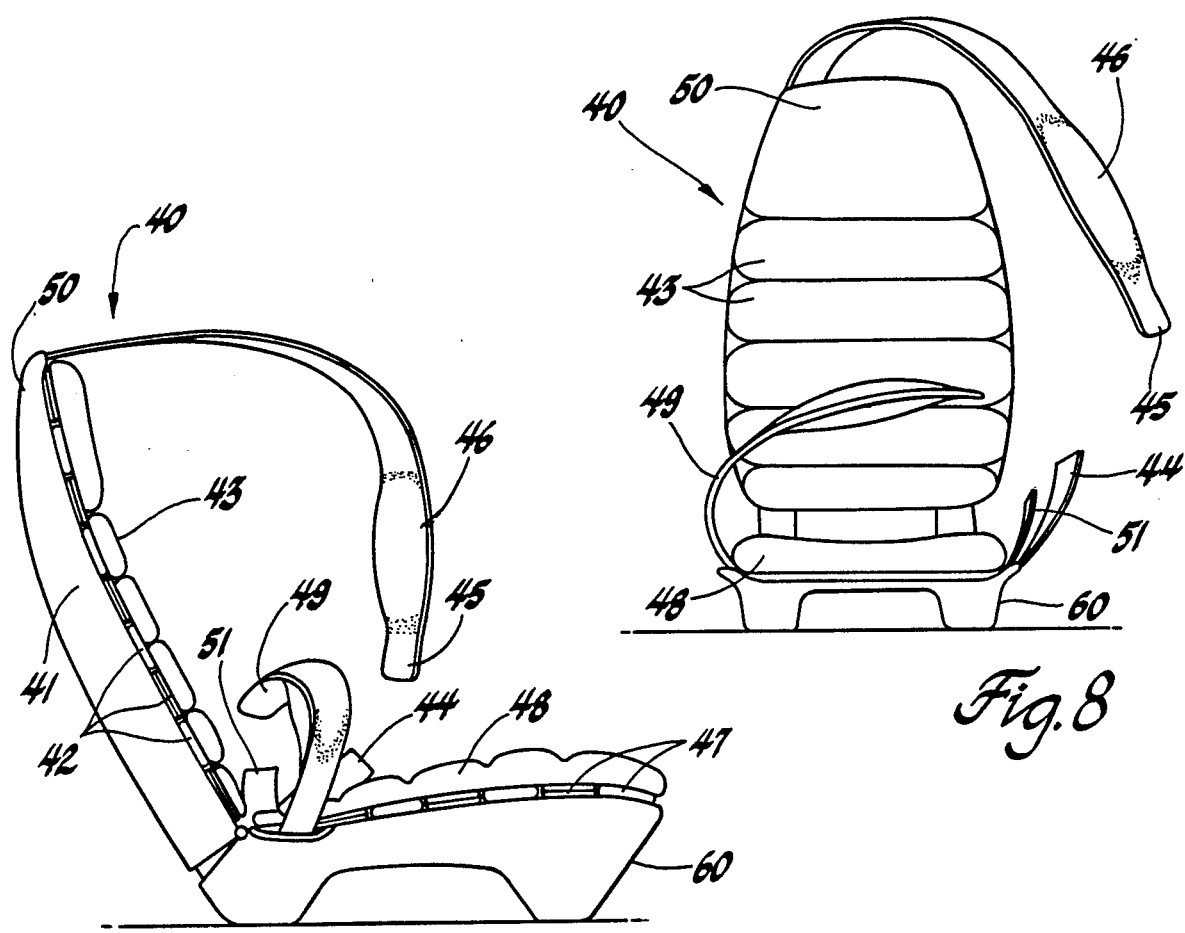
Fig. 8
Fig. 9
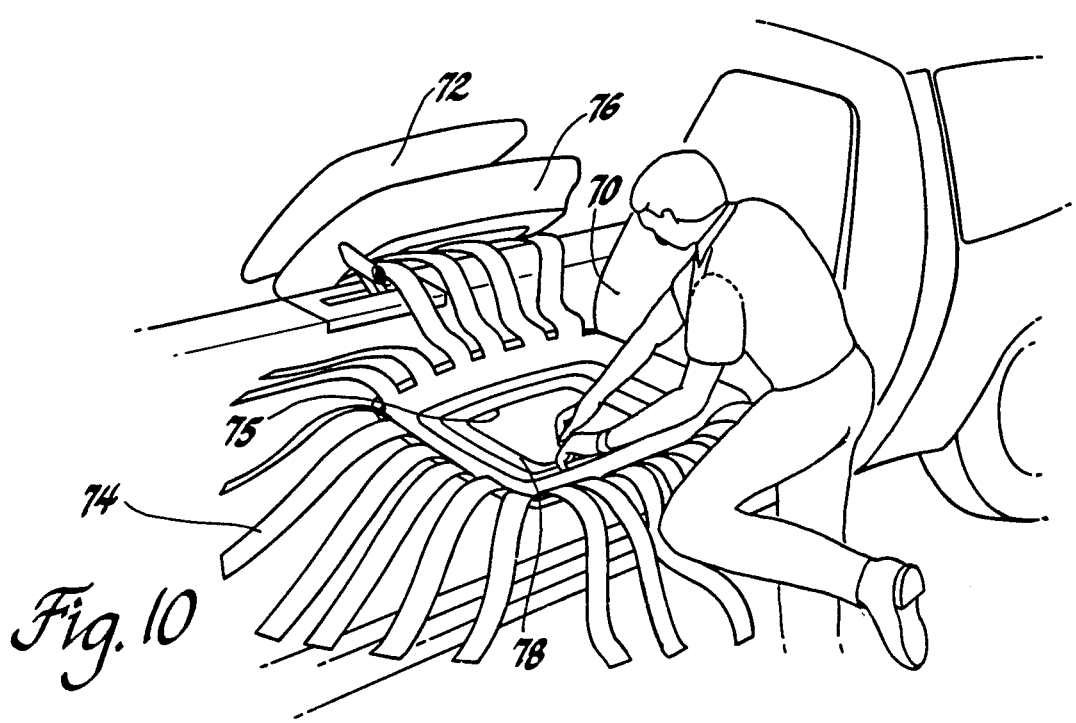
Fig. 10

VEHICLE SEAT CONSTRUCTION

FIELD OF THE INVENTION

The field of the present invention is that of vehicle seats. More particularly the field of the present invention is that of vehicle seats with shoulder harness or lap belt occupant restraint systems.

DISCLOSURE STATEMENT

It is well known in the art to provide vehicle seating with occupant belt restraint systems such as lap belts and shoulder harnesses. The typical vehicle seat has a steel frame which is covered with various padding materials. After the seat is assembled a shoulder harness or lap belt is then fixably attached to the seat and anchored to the vehicle frame.

SUMMARY OF THE INVENTION

To provide a vehicle seat construction which provides a built-in occupant restraint system, the present invention is brought forth. The present invention provides a vehicle seat with a web laminated construction. The vehicle seat of the present invention has a back and/or femur cushion with pan-shaped inner and outer shells. Captured between the inner shell and the outer shell is a spider with projecting legs. The legs are folded over the inner shell to form a woven cushion for the seat occupant as well as providing the shoulder harness or belt restraint systems. The present invention provides a seat with increased ease of assembly having fewer parts.

It is an object of the present invention to provide a vehicle seat which is simple to manufacture. It is another object of the present invention to provide a vehicle seat construction with an integral occupant restraint systems.

It is still yet another object of the present invention to provide a motor vehicle seat construction in combination comprising: a seat back generally vertically oriented including; a metallic ribbed pan-shaped back plate assembly including inner and outer back shells, an extruded one piece polymer flexible spider captured between the back inner and outer shells with projecting fiber glass fiber reinforced legs bridging over the back plate assembly opposite the back outer shell providing a back cushion for the seat, and whereby the legs provide a blistered contour for the back cushion and a shoulder harness for the seat; and a femur structure adjacent to the seat back and extending generally horizontal from the seat back, the femur structure including; a metallic pan shaped femur support assembly including inner and outer femur shells and the outer shell having a central aperture, an extruded one piece polymer flexible spider captured between the femur inner and outer shells with fiber glass fiber reinforced legs bridging over the femur support assembly opposite the outer femur shell providing a femur cushion for the seat and whereby said legs also provide a lap belt restraint for the seat.

Other objects, desires and advantages of the present invention will become more apparent to those skilled in the art as the nature of the invention is better understood from the accompanying drawings and a detailed description.

BRIEF DESCRIPTION OF THE DRAWINGS

FIGS. 1 through 4 illustrate the fabrication of an embodiment of a seat back according to the present invention;

FIGS. 8 and 9 illustrate a second embodiment of the present invention with a back with shoulder restraint and a femur structure with lap restraint;

FIG. 10 illustrates a third embodiment of the present invention with the femur structure of the seat being partially disassembled to gain access to the floor mount of the vehicle.

DETAILED DESCRIPTION OF THE DRAWINGS

Figure 5:
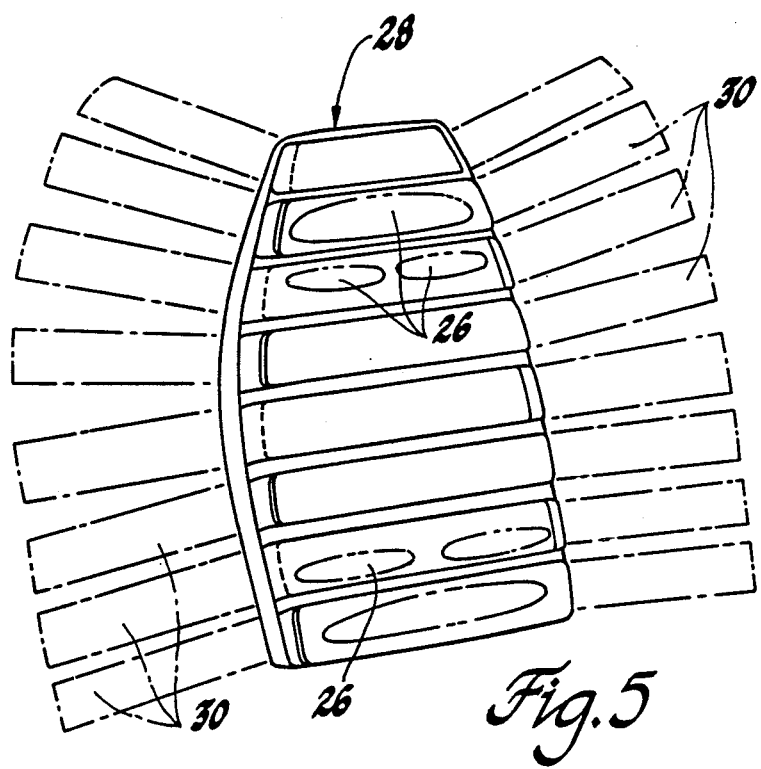
FIGS. 5 and 6 illustrate a seat back an embodiment of a seat back according to the present invention having a blistered contour.

Referring to FIGS. 1, 2, 3, 4 and 7, the motor vehicle seat back 10 construction of the present invention includes a hardened back plate assembly 11. The back plate assembly is fabricated from a hardened material, usually metallic and is pan shaped with ribs 13. The back plate assembly 11 includes an outer back shell 14 and an inner back shell 12.

Captured between the seat back inner and outer shells 12 and 14 is a single piece flexible spider 16. The body of the spider is typically made from an extruded sheet polymer material. The spider 16 has projecting outwardly from it a plurality of fiber glass fiber reinforced legs 18.

In assembly of the seat back 10 the spider 16 is placed between the back inner and outer shells. The legs 18 of the spider 16 are bridged over the seat back plate assembly 11 opposite the outer shell 12 providing a cushion for the seat. It will be apparent to those skilled in the art of the many modifications to the legs 18 which can be made for texturing or to aid in the weaving operation. Synthetic materials 19 (FIG. 3) may be added to the legs which will make the legs adhere to each other when pressed together as shown in FIG. 4.

Provided integral with the spider 16 is a shoulder harness 20 and lap belt 22. After assembly seat back 10, the latching hardware (not shown) will be attached to shoulder harness 20 and lap belt 22.

Figure 6:
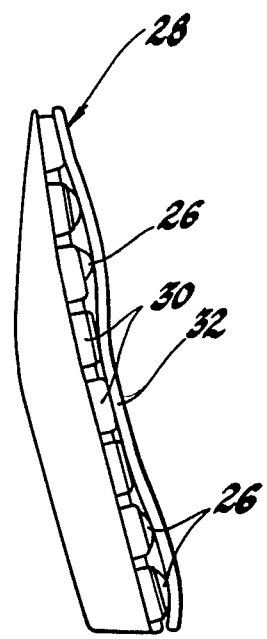
Figure 7:
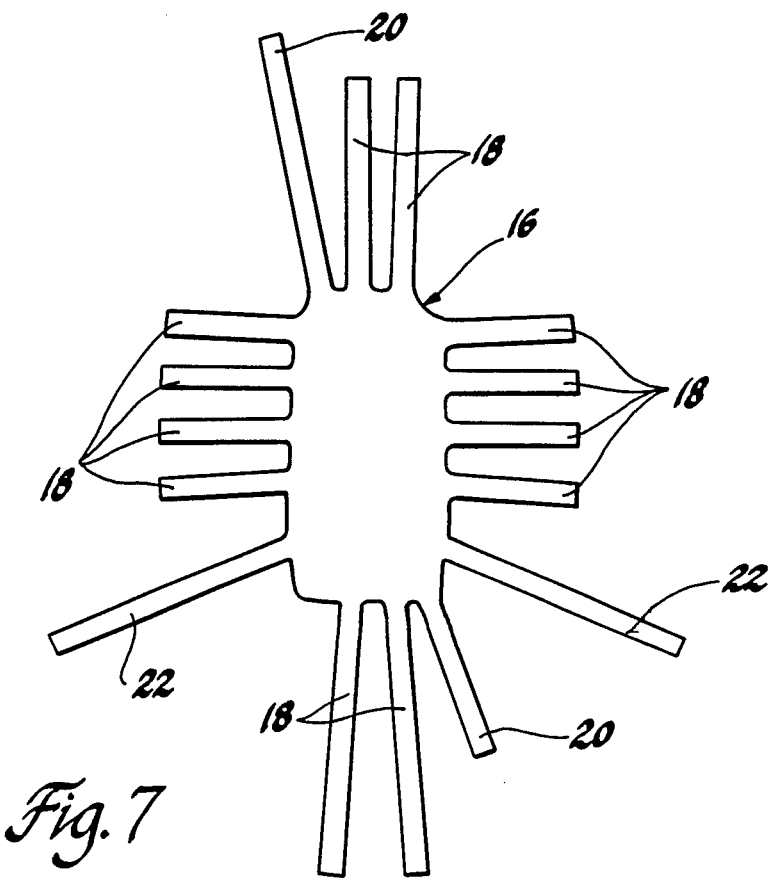
FIG. 7 illustrates a spider utilized in the seat back illustrated in FIGS. 1-4.

Referring to FIGS. 5 and 6 a second embodiment seat back 28 of the present invention provides a preformed molded blisters 26 in the legs 30 of the spider. The blister 26 aids in providing the contoured seat back 28. A foam pad member 32 is added above folded legs 30 to provide the seat occupant contact surface.

Referring to FIGS. 8 and 9 there is illustrated a third embodiment seat 40 of the present invention. The seat 40 has a seat back 50 with a pan shaped back plate assembly 41. Spider legs 42 are bridged over the back plate assembly 41 to provide the back cushion. Foam padding 43 is added on top of the spider legs 42 to provide the surface of occupant contact. The spider also supplies legs for the shoulder harness restraint 44 and 45.

Shoulder harness 45 has a molded blister 46 which is added for occupant comfort.

The femur structure 60 is adjacent to the seat back 50 and extends generally horizontally. The spider of femur structure 60 has bridging over it spider legs 47 providing a femur cushion for the seat. Pad 48 is added on top to provide the surface of contact for the seat occupant. The fiber glass fiber reinforced legs 51 and 49 provide the lap belt. The shoulder harness 44, 45 and lap belt 49, 51 will be supplied with fasteners or may utilize synthetic materials which will adhere to each other when pressed together as previously described for item 19 in FIG. 3.

Referring to FIG. 10, when it is desired to gain access to the floor mounting underneath seat 70, the padded cushion 72 is removed. Spider legs 74 will then be loosened, and the femur inner shell 76 of the femur support assembly is removed. To reach the hardware underneath the seat 70 (such as the seat adjusters - not shown) one can now reach through central aperture 75 of the outer femur shell 78 of the femur support assembly.

While a few of the embodiments of the present invention have been explained it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A motor vehicle seat construction, said construction in combination comprising:
   a hardened pan shaped back plate assembly including inner and outer shells; and
   a flexible sheet of material with legs projecting outwardly therefrom, the sheet being captured between said back inner and outer shells with said projecting legs bridging over said back plate assembly opposite said back outer shell to provide a cushion for a said seat, and whereby said projecting legs also provide a belt restraint for said seat.

2. A motor vehicle seat construction said construction in combination comprising:
   a generally vertically oriented seat back including;
      a metallic ribbed pan shaped back plate assembly including inner and outer back shells;
      an extruded one piece polymer flexible sheet of material with legs projecting outwardly therefrom, the sheet being captured between said back plate assembly inner and outer shells with said projecting legs bridging over said back plate assembly opposite said back outer shell to provide a back cushion for said seat, and whereby said projecting legs also provide a shoulder harness for said seat; and
   a femur structure adjacent to said seat back projecting generally horizontally from said seat back, said femur structure including;
      a hardened pan shaped femur support assembly including inner and outer femur shells; and
      an extruded one piece polymer flexible sheet of material with legs projecting outwardly therefrom, captured between said femur inner and outer shells with said projecting legs bridging over said femur support assembly opposite said femur outer shell to provide a femur cushion for said seat and whereby said projecting legs also provide a lap belt for said seat.

3. A motor vehicle seat construction said construction in combination comprising:
   a seat back generally vertically oriented including;
      a metallic ribbed pan shaped back plate assembly including inner and outer back shells; and
      an extruded one piece polymer flexible sheet of material with fiberglass fiber reinforced legs projecting outwardly therefrom, said sheet being captured between said back inner and outer shells with said projecting fiber glass fiber reinforced legs bridging over said back plate assembly opposite said back outer shell to provide a blistered contoured back cushion for said seat, and whereby said projecting fiberglass fiber reinforced legs also provide a shoulder harness for said seat; and
   a femur structure adjacent to said seat back and extending generally horizontal from said seat back, said femur structure including;
      a metallic pan shaped femur support assembly including inner and outer femur shells and said outer shell having a central aperture;
      an extruded one piece polymer flexible sheet of material with fiberglass fiber reinforced legs projecting outwardly therefrom, said sheet being captured between said femur inner and outer shells with said projecting fiber glass fiber reinforced legs bridging over said femur support assembly opposite said outer femur shell to provide a femur cushion for said seat and whereby said projecting fiberglass fiber reinforced legs also provide a lap belt restraint for said seat.

* * * * *